Figure 1:
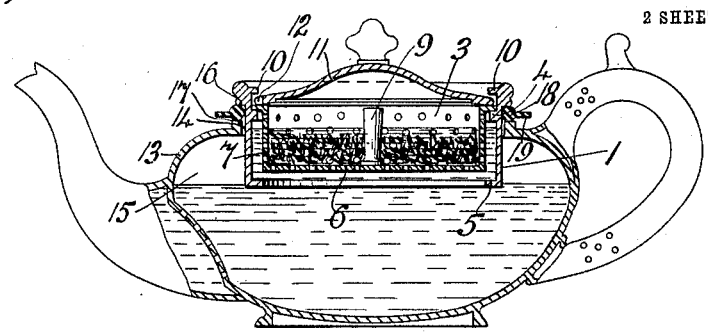

A. F. GARDNER.
TEA AND COFFEE POT AND THE LIKE.
APPLICATION FILED JUNE 19, 1911.

1,038,558.

Patented Sept. 17, 1912.

2 SHEETS—SHEET 1.

Witnesses
Ira P. Ames
Nevelle Lyles

Inventor.
Alfred Francis Gardner,
by Connolly Bros
Atty's

A. F. GARDNER.
TEA AND COFFEE POT AND THE LIKE.
APPLICATION FILED JUNE 19, 1911.

1,038,558.

Patented Sept. 17, 1912.
2 SHEETS—SHEET 2.

Witnesses

Inventor
Alfred Francis Gardner
by Connolly Bros
attys

UNITED STATES PATENT OFFICE.

ALFRED FRANCIS GARDNER, OF LEICESTER, ENGLAND.

TEA AND COFFEE POT AND THE LIKE.

1,038,558.  Specification of Letters Patent.  Patented Sept. 17, 1912.

Application filed June 19, 1911. Serial No. 633,936.

*To all whom it may concern:*

Be it known that I, ALFRED FRANCIS GARDNER, subject of the King of Great Britain, residing at Leicester, in the county of Leicester, England, have invented certain new and useful Improvements in or Relating to Tea and Coffee Pots and the Like, of which the following is a specification, reference being had therein to the accompanying drawing.

The invention relates to tea and coffee pots and has particular reference to the atmospheric type of pot employed for the scientific preparation of an infusion of tea or coffee.

The present invention comprises general improvements in this kind of tea or coffee pot, the advantages and purposes of which will be understood as they are described.

This invention makes it possible for either a full pot of the beverage to be made on the scientific principle, or for a smaller quantity, say half a pot, of the beverage to be made in the ordinary manner of infusion. In the one case the liquid may be withdrawn from the leaves or grounds by discharging the air as heretofore, while in the other case the liquid will be withdrawn from the substance after a small quantity of the beverage has been poured out of the pot. In order to make this possible the construction of the inner tubular neck and the strainer is improved so that the strainer may either occupy a position at the top of the neck for making a full pot of tea or it may be placed lower down at the bottom of the neck when a half pot of tea is required.

Another improvement according to this invention in connection with a tea or coffee pot of the kind referred to is to make the cylindrical or tubular internal neck containing the strainer detachable from the pot. I am aware that in the case of a pot having a depending tubular neck provided with a single strainer it has already been proposed to make the neck detachable by screwing it into a threaded ring on the pot.

This invention therefore improves the construction whereby the tubular neck may be capable of detachment from the pot for cleaning or renewal purposes without in any way affecting the operation of the air chamber formed between said tubular neck and the body of the pot. To this end the tubular neck or infusing device of the pot is formed separately from the body and is adapted to fit into the opening in the top of the pot with an air tight joint which is formed preferably by means of a rubber or like ring.

I will now describe, by way of example, a specific construction of tea pot wherein the improvements hereinbefore mentioned are embodied, and in further describing the invention reference will be made to the accompanying drawings in which—

Figure 2:
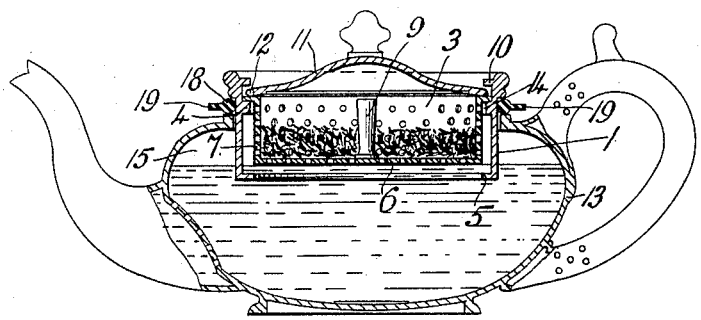
Figure 3:
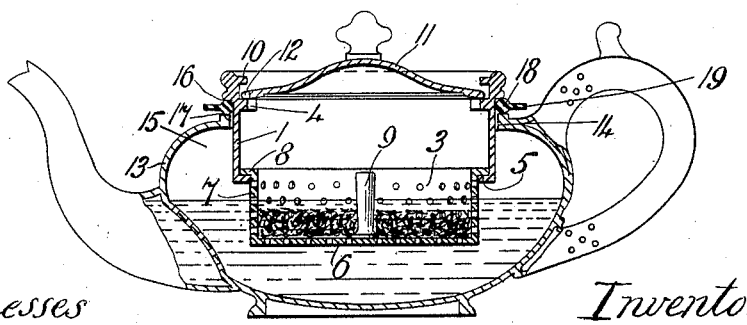
Figure 4:
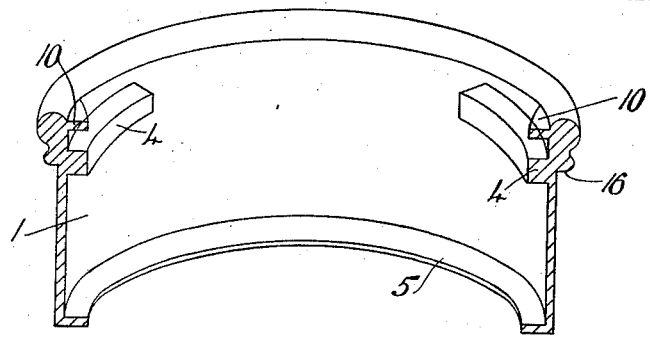
Figure 5:
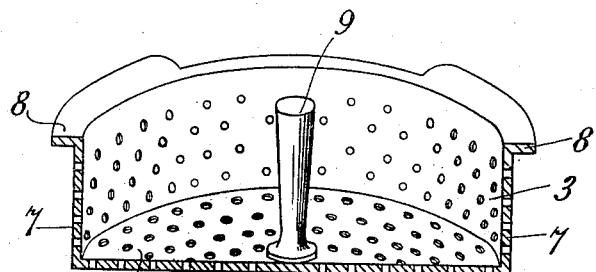
Figure 6:
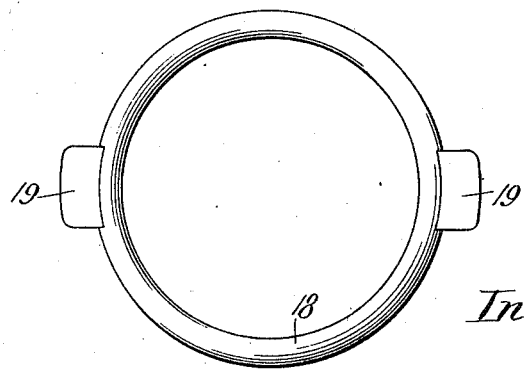

Figure 1, is a sectional view of the improved pot and shows the same as being used for making a full pot of tea on the scientific principle the infusion of the leaves being represented as taking place in this view. Fig. 2, is a similar view of the same pot and shows the liquid withdrawn from the leaves to prevent further infusion taking place. Fig. 3, is a sectional view of the pot and shows the same as being used for making a smaller quantity of tea. Fig. 4, is a sectional perspective view of the detachable inner tubular neck *per se.* Fig. 5, is a similar view of the strainer. Fig. 6, is a plan view of the rubber ring employed to make an air tight joint between the removable neck and the body of the pot. Figs. 4 to 6 are drawn to a larger scale than Figs. 1 to 3, and like parts are designated by the same reference characters throughout the drawings.

In a tea or coffee pot constructed according to this invention the inner cylindrical neck 1 is furnished with means to support the strainer 3 at two different levels.

The upper supporting means consist of ledges 4 which are located partly around the interior upper part of the neck 1, as shown in Fig. 4, and the lower support consists of a rim or internal flange 5 formed on the lower edge of the neck 1.

The strainer 3 is of cylindrical or cup like character, as shown in Fig. 5, the bottom 6 and sides 7 being perforated, and said strainer is furnished at the top with outwardly projecting flanges or lips 8. A handle 9 is fixed in the strainer and serves as a means by which the strainer may be lifted in and out of the neck when required.

When it is desired to make a full pot of tea or coffee, the strainer 3 is arranged to occupy the high position in the neck 1. When in this position, the flanges or lips 8 of the strainer 3 rest upon the internal ledges 4 of the neck 1 as shown in Figs. 1 and 2. When however a smaller quantity of tea is required, the strainer 3 is lowered into the cylindrical neck 1, the projecting flanges or lips 8 of the strainer passing through the space or interruption between the ends of the ledges 4 of the neck. The strainer 3 is supported in the low position by means of its flanges 8 resting on the internal rim 5 of the neck 1 as shown in Fig. 3.

The tubular neck 1 is preferably furnished near its upper edge with small lips 10 which extend over the flanges 8 on the strainer when the latter rests upon the ledges 4 and said lips 10 prevent the accidental lifting of the strainer. The flanges 8 of the strainer may be brought into position on the ledges 4 and underneath the lips 10 by slightly rotating the strainer after it has been inserted into the upper part of the neck 1.

The lid 11 may rest on the strainer 3 when the latter is in the upper position (Figs. 1 and 2) and said lid may rest upon the ledges 4 when the strainer is in the lower position (Fig. 3). To enable the lid to pass under the lips 10 the edge of the lid has an opening 12 at one part therein so that the edge of the lid may be inserted under one of the lips 10 and then the opening 12 will pass over the other lip after which the lid may be rotated to secure it underneath both lips 10.

Instead of the tubular neck 1 being integrally formed with the body 13 of the pot or being screwed therein it is made readily removable and is adapted to be lifted straight out of the opening 14 in the tea pot body 13.

The opening 14 in the teapot is quite plain and the removable neck fits easily therein and beds down to make an air tight joint between said neck and the body 13 so as to form the internal air chamber 15.

The opposing faces 16 and 17 of the neck 1 and body 13 respectively may either be flat, i. e. horizontal as shown in the drawings, or they may be vertical or conical, and located between the said two faces is a rubber ring 18 which is slightly compressed when the neck 1 is in position and thus forms an airtight joint. In the preferred arrangement the removable neck 1 simply rests in the opening 14 of the teapot body 13 the outer cylindrical side of the neck and the top of the teapot body 13 forming the air chamber 15.

When the pot is to be used for making a full pot of tea on the scientific principle the strainer 3 is placed in position on the ledges 4 in the neck and when the pot is filled with water the entrapped air in the chamber 15 prevents the water rising above the level of the bottom of the neck on the exterior of same but maintains the water at a higher level inside the neck so that the contents of the strainer 3 are covered as represented in Fig. 1.

When it is desired that the liquid should be withdrawn from the strainer the confined air is released from the air chamber 15 and this may be effected either by slightly raising the neck 1 bodily from the pot or by pulling the rubber ring 18 out from between the neck 1 and body 13 on opposite sides. Either of the above described operations breaks the airtight joint between the neck 1 and body 13 and the air escapes from the chamber 15 through the opening 14 in the body there being sufficient space between the outside of the neck and the opening for this purpose.

The rubber ring 18 is preferably furnished with tabs 19 (Fig. 6) which may be taken hold of by the fingers for the purpose of stretching or pulling said ring outward as just described to release the air from the chamber 15. The teapot body 13 may however be furnished with a valve as heretofore (not shown) for releasing the air from the chamber 15 but it is preferred that such valve should be omitted.

The release of the entrapped air from the chamber 15 allows the liquid to rise on the outside of the neck so as to drain away from the contents of the strainer as shown in Fig. 2.

The actual infusing operation just described is the same in the present construction of pot as it is in the same type of pot heretofore constructed, and this invention does not claim this operation as being one of its features.

When a smaller quantity of tea is required, the strainer is placed at the lower level resting on the flange 5 and the water is poured in to cover the contents of the strainer as represented in Fig. 3. This method makes the beverage in the ordinary manner although even when making the smaller quantity a scientific infusion may be effected either by lifting the strainer from the lower to the higher position when the time allowed for the proper infusion has elapsed, or by pouring a small quantity of the beverage from the pot so as to lower the level of the liquid in the pot and withdraw it from the strainer.

The hereindescribed construction of the removable neck 1 and strainer 3 renders them particularly adapted for use with an ordinary teapot said parts forming an infusing apparatus which enables a scientific infusion of tea or coffee to be made in an ordinary pot.

The removable neck 1 may, in a modified construction be temporarily fastened in position in the teapot body 13 by any suitable means (not shown) so as to make a more perfect joint between said parts.

What I claim is:—

For use in a tea or coffee pot, a tubular neck constructed to be loosely inserted into the opening of the pot and form an air chamber on the interior of the latter, a rubber ring to be located between the opposing faces of the neck and pot and to make an air tight joint therebetween, internal ledges at the top of the neck, an internal flange at the lower end of the neck, a detachable cylindrical strainer, external lips on said strainer constructed to rest upon either the ledges at the top or the flange at the bottom of the neck to support the strainer in an upper or lower position therein, lifting means on the strainer, and a lid to fit within the upper end of the neck, substantially as described.

In testimony whereof I affix my signature in presence of two witnesses.

ALFRED FRANCIS GARDNER.

Witnesses:
J. W. C. TAYLOR,
GEORGE LESTER.